United States Patent
Miura et al.

(10) Patent No.: US 9,843,030 B2
(45) Date of Patent: Dec. 12, 2017

(54) POLYOLEFIN MULTILAYER MICROPOROUS MEMBRANE AND BATTERY SEPARATOR

(71) Applicant: TORAY BATTERY SEPARATOR FILM CO., LTD., Tochigi (JP)

(72) Inventors: Yukiko Miura, Nasushiobara (JP); Hideto Mitsuoka, Nasushiobara (JP); Takashi Kubota, Nasushiobara (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/113,004

(22) PCT Filed: May 28, 2015

(86) PCT No.: PCT/JP2015/065348
§ 371 (c)(1),
(2) Date: Jan. 30, 2017

(87) PCT Pub. No.: WO2015/182689
PCT Pub. Date: Dec. 3, 2015

(65) Prior Publication Data
US 2017/0149038 A1  May 25, 2017

(30) Foreign Application Priority Data
May 30, 2014  (JP) ................. 2014-112048

(51) Int. Cl.
*H01M 10/42* (2006.01)
*H01M 2/16* (2006.01)
(Continued)

(52) U.S. Cl.
CPC ........ *H01M 2/1653* (2013.01); *B01D 67/002* (2013.01); *B01D 67/003* (2013.01);
(Continued)

(58) Field of Classification Search
CPC .... H01M 10/42; H01M 10/0525; H01M 2/16; B01D 69/02; B01D 71/26; B01D 69/12; B29C 47/00; B29B 7/00
See application file for complete search history.

(56) References Cited

U.S. PATENT DOCUMENTS

2008/0057389 A1  3/2008  Kono et al.
2011/0290727 A1*  12/2011  Van Engelen ......... B01D 69/02
                                                      210/650
(Continued)

FOREIGN PATENT DOCUMENTS

CN  101511589 A  8/2008
CN  102712185 A  10/2012
(Continued)

OTHER PUBLICATIONS

International Search Report for PCT/JP2015/065348, dated Aug. 18, 2015, 2 pages.

*Primary Examiner* — Mark F Huff
*Assistant Examiner* — Monique Wills
(74) *Attorney, Agent, or Firm* — Kilpatrick Townsend & Stockton LLP

(57) ABSTRACT

A polyolefin multilayer microporous membrane is disclosed. The polyolefin multilayer microporous membrane has at least three layers, the membrane comprising a first microporous layer composed of a polyethylene resin containing an ultrahigh molecular weight polyethylene (surface layers) and a second microporous layer composed of a polyolefin rein containing a high-density polyethylene and polypropylene (intermediate layer), wherein (I) the pin puncture strength is at least 25 g/μm, (II) the coefficient of static friction with respect to a metal foil is at least 0.40, and (III) the meltdown temperature is at least 180° C.

4 Claims, 2 Drawing Sheets

(51) Int. Cl.
   *B32B 27/32* (2006.01)
   *C08J 9/00* (2006.01)
   *C08L 23/06* (2006.01)
   *C08L 23/12* (2006.01)
   *H01M 10/0525* (2010.01)
   *B01D 71/26* (2006.01)
   *B01D 67/00* (2006.01)
   *B01D 69/12* (2006.01)
   *B32B 27/08* (2006.01)

(52) U.S. Cl.
   CPC ......... *B01D 67/0027* (2013.01); *B01D 69/12* (2013.01); *B01D 71/26* (2013.01); *B32B 27/08* (2013.01); *B32B 27/32* (2013.01); *C08J 9/00* (2013.01); *C08L 23/06* (2013.01); *C08L 23/12* (2013.01); *H01M 2/16* (2013.01); *H01M 2/1686* (2013.01); *H01M 10/0525* (2013.01); *B01D 2313/12* (2013.01); *B01D 2325/04* (2013.01); *B01D 2325/22* (2013.01); *B01D 2325/24* (2013.01); *B01D 2325/34* (2013.01); *B32B 2307/308* (2013.01); *B32B 2307/581* (2013.01); *B32B 2307/744* (2013.01); *B32B 2457/10* (2013.01); *C08L 2203/20* (2013.01); *C08L 2205/02* (2013.01); *C08L 2207/062* (2013.01); *C08L 2207/068* (2013.01)

(56) References Cited

U.S. PATENT DOCUMENTS

2012/0231323 A1    9/2012  Takagi et al.
2016/0329609 A1*  11/2016  Kikuchi .............. B01D 67/0027

FOREIGN PATENT DOCUMENTS

| EP | 2057013 A1 | 5/2009 |
| EP | 2502743 A1 | 9/2012 |
| JP | 3347854 B2 | 11/2002 |
| JP | 2010/245028 A | 10/2010 |
| JP | 2011/126275 A | 6/2011 |
| JP | 2008/255306 A | 10/2012 |
| KR | 2009-0057295 A | 6/2009 |
| KR | 2012-0083532 A | 7/2012 |
| KR | 2013/035293 A | 2/2013 |
| WO | 2004/089627 A1 | 10/2004 |
| WO | 2007/010878 A1 | 1/2007 |

* cited by examiner

POLYOLEFIN MULTILAYER MICROPOROUS MEMBRANE AND BATTERY SEPARATOR

This application is a United States National Phase Application of co-pending International Patent Application Number PCT/JP2015/065348, filed May 28, 2015 and entitled "POLYOLEFIN MULTILAYER MICROPOROUS MEMBRANE AND BATTERY SEPARATOR", which Application claims priority to Japanese Patent Application Number 2014-112048, filed with the Japanese Patent Office on May 30, 2014, the contents of which are incorporated herein by reference in their entirety

TECHNICAL FIELD

The present invention relates to a polyolefin multilayer microporous membrane and a battery separator using the same, and more particularly to a polyolefin multilayer microporous membrane having excellent mechanical strength, heat resistance, and electrolyte wettability, and a battery separator using the same.

BACKGROUND

Non-aqueous electrolytic secondary batteries such as lithium ion secondary batteries are widely used as the main power supplies of portable electronic devices or power supplies for driving hybrid electric vehicles or the like since they are small and lightweight and have high energy density. In a lithium ion secondary battery, a separator is disposed between positive and negative electrodes. The separator prevents shorting due to contact between active materials of both polarities and holds an electrolytic solution in the pores thereof so as to form a pathway for ion conduction.

The burden on battery members has increased in step with increases in the energy density of lithium ion secondary batteries in recent years, and separators are also required to have a higher degree of safety performance. Therefore, a separator for a lithium ion secondary battery must not only have excellent mechanical strength, but must also exhibit excellent thermal shrinkage characteristics at high temperatures by demonstrating excellent results in high-temperature cycle tests, oven tests, and the like, which are tests for evaluating battery safety prescribed by U.S. Standard UL-1642 (Underwriters Laboratories) or the International Electrotechnical Commission Standard IEC-61960 (International Electrotechnical Commission), and the like when used in the form of a battery.

Polyolefin microporous membranes have long been used as separators for lithium ion secondary batteries. Among polyolefin microporous membranes, microporous membranes comprising polyethylene resins, in particular, are known to have an excellent shutdown function, whereby the micropores of the porous membrane are blocked so as to block the flow of current when the temperature of the battery increases.

However, the battery temperature may increase further after the shutdown function has been activated, and in such cases, the melting (so-called "meltdown") of the separator progresses and causes shorting inside the battery. This generates a large amount of heat, which leads to the risk of smoke, fire, and explosion. Therefore, in addition to a shutdown function, there is a demand for a separator to have excellent heat resistance so that there is no risk of shorting even when a temperature higher than the temperature at which the shutdown function is activated is reached, and so that the risk of shorting is suppressed even when held for a certain amount of time at a temperature higher than the shutdown temperature.

Accordingly, in order to enhance the heat resistance of a separator, a polyolefin microporous membrane containing polypropylene, which has a higher melting point than polyethylene, has been proposed (for example, see Patent Document 1). However, although a microporous membrane containing a polypropylene resin has a high meltdown temperature, there has been a problem in that the shutdown temperature is also high.

In addition, in order to achieve both shutdown characteristics and meltdown characteristics, it has also been proposed to blend a polyethylene and a polypropylene or to laminate a microporous membrane comprising a polyethylene resin and a microporous membrane comprising a polypropylene resin.

For example, in Patent Document 2, in a polyolefin multilayer microporous membrane comprising at least three layers, the surface layers on both sides are layers comprising only a polyethylene resin, and an inner layer, which contains a polyethylene resin and a polypropylene having a heat of fusion ($\Delta H_m$) of at least 90 J/g when measured by differential scanning calorimetry, wherein the compounding ratio thereof is adjusted appropriately, is interposed between both polyethylene resin layers. In this case, it is disclosed that a polyolefin multilayer microporous membrane which exhibits a low shutdown temperature, high shutdown rate, and high meltdown temperature and has excellent film forming properties is obtained.

In addition, in Patent Document 3, a first microporous layer containing a first polyethylene resin in which the proportion of ultrahigh molecular weight polyethylene having a weight average molecular weight of at least $1 \times 10^6$ is at least 8 mass %, and a second microporous layer containing a second polyethylene resin in which the proportion of ultrahigh molecular weight polyethylene is at most 7 mass % and having a structure in which a pore distribution curve determined by a mercury penetration method has at least two peaks, are provided, wherein when the total thickness of the first and second microporous layers is defined as 100%, the thickness of the first microporous layer is from 15 to 60%. In this case, it is disclosed that a polyolefin multilayer microporous membrane having an excellent balance of permeability, mechanical strength, meltdown characteristics, electrolyte absorbency, and electrolyte retention is obtained.

Under such circumstances, there is a demand for the development of a polyolefin multilayer microporous membrane which solves the problems of conventional polyolefin multilayer microporous membranes and pursues the further enhancement of mechanical strength and heat resistance in step with the increasing performance of lithium ion secondary batteries, and a battery separator using the same.

PRIOR ART DOCUMENT

Patent Document

Patent Document 1: WO/2004/089627
Patent Document 2: WO/2007/010878
Patent Document 3: Japanese Unexamined Patent Application Publication No. 2008-255306A

SUMMARY OF THE INVENTION

Problems to be Solved by the Invention

In light of the problems of the conventional technology described above, an object of the present invention is to provide a polyolefin multilayer microporous membrane having excellent mechanical strength, heat resistance, and electrolyte wettability, and a battery separator using the same.

Means to Solve the Problem

As a result of conducting dedicated research in order to solve the problem described above, the present inventors conceived the notion that by enhancing the adhesion between a polyolefin multilayer microporous membrane and electrodes, the heat resistance when used as a separator for a lithium ion secondary battery may also improve. The present inventors then discovered that the problem described above can be solved by a polyolefin multilayer microporous membrane having at least three layers including a first microporous layer comprising a polyethylene resin containing an ultrahigh molecular weight polyethylene (surface layers) and a second microporous layer comprising a polyolefin rein containing a high-density polyethylene and polypropylene (intermediate layer), wherein (I) the pin puncture strength, (II) the coefficient of static friction with respect to a metal foil, and (III) the meltdown temperature are within specific ranges, and the present inventors thereby completed the present invention.

That is, the polyolefin multilayer microporous membrane of the present invention is a polyolefin multilayer microporous membrane having at least three layers, a first microporous layer being both surface layers and a second microporous layer being an intermediate layer: the first microporous layer comprising a polyethylene resin containing at least 30 mass % and less than 70 mass % of an ultrahigh molecular weight polyethylene having a weight average molecular weight of at least $1\times10^6$; the second microporous layer comprising a polyolefin resin containing at least 50 mass % of a high-density polyethylene having a weight average molecular weight of at least $1\times10^4$ and less than $8\times10^5$ and a polypropylene: a polypropylene content in the multilayer microporous membrane being at least 5 mass % and at most 15 mass % with respect to a total of 100 mass % of the polyethylene resin and the polyolefin resin contained in both surface layers and the intermediate layer; and the polyolefin multilayer microporous membrane satisfying the following requirements (I) to (III).

(I) A pin puncture strength is at least 25 g/μm.
(II) A coefficient of static friction in an MD direction and a TD direction of both surface layers with respect to an aluminum foil is respectively at least 0.40.
(III) A meltdown temperature is at least 180° C.

The polyolefin multilayer microporous membrane preferably has an average pore size of at least 0.001 μm and less than 0.030 μm.

In addition, the polyolefin multilayer microporous membrane preferably has a membrane thickness of at least 1 μm and less than 20 μm and an air permeability of at most 600 sec/100 cc.

Further, it is preferable for the area retention rate to be at least 90% when the polyolefin multilayer microporous membrane is disposed between the positive and negative electrodes of a lithium ion secondary battery and exposed for one hour at 150° C.

The battery separator of the present invention is formed using the polyolefin multilayer microporous membrane described above.

Effect of the Invention

The polyolefin multilayer microporous membrane of the present invention has excellent mechanical strength, electrolyte wettability, and electrode adhesion and therefore outstanding heat resistance. In addition, when used as a battery separator, it is possible to provide a non-aqueous electrolytic battery having sufficient mechanical strength and shutdown characteristics and having high safety so that thermal runaway, combustion, and the like are suppressed.

BEST MODE FOR CARRYING OUT THE INVENTION

1. Polyolefin Multilayer Microporous Membrane

Figure 1:
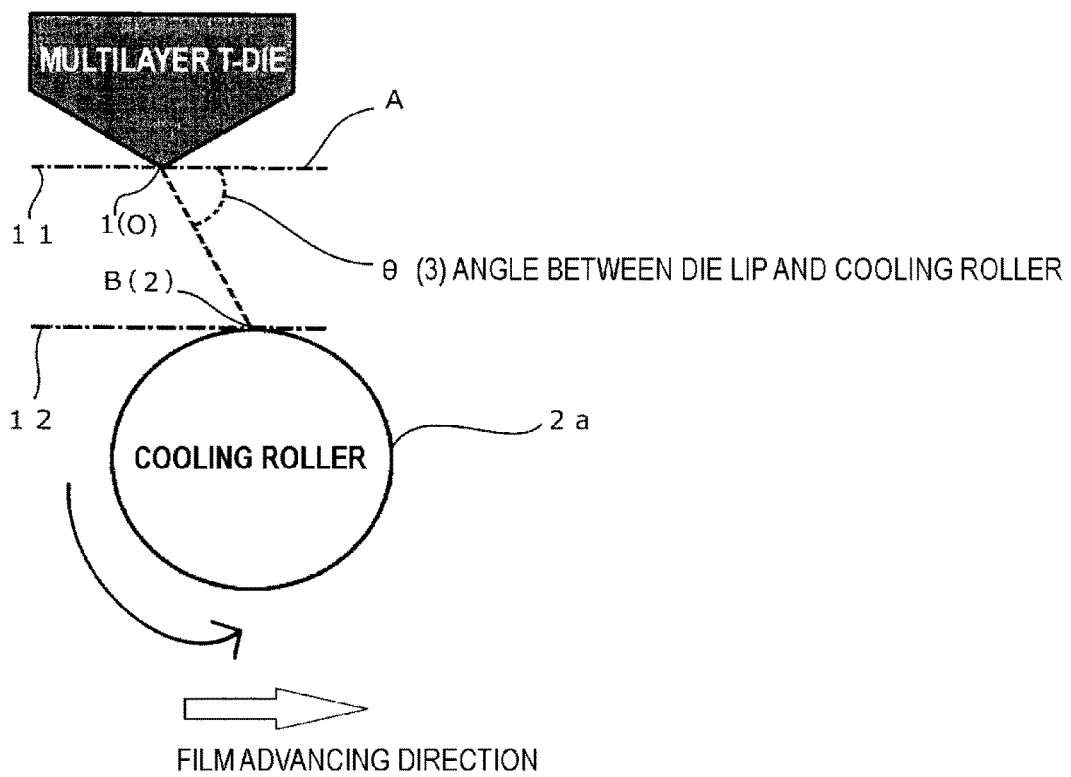
FIG. 1 is an explanatory diagram illustrating the angle θ between the lip end of a die and the top of a cooling roller.

The polyolefin multilayer microporous membrane of the present invention has at least three layers, a first microporous layer being both surface layers and a second microporous layer being an intermediate layer, wherein the first microporous layer is composed of a polyethylene resin containing a specific amount of an ultrahigh molecular weight polyethylene, and the second microporous layer is composed of a polyolefin resin containing a specific amount of a high-density polyethylene and a polypropylene. The polyolefin multilayer microporous membrane has excellent mechanical strength, heat resistance, electrode adhesion, electrolyte wettability, and the like and can be suitably used for a secondary battery separator.

Each component of the present invention will be described hereinafter.
(1) First Microporous Layer The first microporous layer comprises a polyethylene resin containing an ultrahigh molecular weight polyethylene. By using an ultrahigh molecular weight polyethylene in the first microporous layer forming the surface layers, it is possible to achieve a high mechanical strength even when formed as a thin membrane, and when disposed between positive and negative electrodes as a battery separator, the shape of the membrane can be retained even in a state in which the separator has shut down (at least 135° C. and at most 180° C.).

(I) Ultrahigh Molecular Weight Polyethylene

The ultrahigh molecular weight polyethylene used in the present invention has a mass average molecular weight (Mw) of at least $1\times10^6$, preferably from $1\times10^6$ to $15\times10^6$, more preferably from $1\times10^6$ to $5\times10^6$, and even more preferably from $1.5\times10^6$ to $3\times10^6$. When the Mw is in the range described above, the moldability is favorable.

Here, Mw is a value measured by gel permeation chromatography (GPC) described below.

The ultrahigh molecular weight polyethylene is not particularly limited within the aforementioned range satisfying the Mw, and a conventionally known substance may be used. In addition to an ethylene homopolymer, an ethylene/α-olefin copolymer containing a small amount of another α-olefin may be used.

Preferable examples of α-olefins other than ethylene include propylene, butene-1, pentene-1, hexene-1, 4-methylpentene-1, octene-1, vinyl acetate, methyl methacrylate, and styrene. The content of the α-olefin other than ethylene is preferably at most 5 mol %.

One type of ultrahigh molecular weight polyethylene may be used alone, or two or more types may be used in combination. For example, two or more types of ultrahigh molecular weight polyethylenes having different molecular weights may be mixed and used.

The content of the ultrahigh molecular weight polyethylene in the polyethylene resin is at least 30 mass % and less than 70 mass %, preferably at least 30 mass % and less than 60 mass %, and more preferably at least 35 mass % and less than 55 mass % with respect to 100 mass % of the entire polyethylene resin. When the content of the ultrahigh molecular weight polyethylene is within the range described above, it is possible to achieve a high mechanical strength even when the polyolefin multilayer microporous membrane is formed as a thin membrane, and when disposed between positive and negative electrodes as a battery separator, the shape of the membrane can be retained even in a state in which the separator has shut down (at least 135° C. and at most 180° C.).

(ii) Other Resin Components

The polyethylene resin described above may contain polyethylenes such as high-density polyethylenes, medium-density polyethylenes, branched low-density polyethylenes, or straight-chain low-density polyethylenes as resin components other than the ultrahigh molecular weight polyethylene. The polyethylene resin preferably contains a high-density polyethylene having a Mw of at least $5\times10^4$ and less than $8\times10^5$ and more preferably contains a high-density polyethylene having a Mw of at least $1\times10^5$ and less than $7\times10^5$. In addition, the density of the high-density polyethylene is preferably from 0.940 to 0.98 g/cm3 and more preferably from 0.950 to 0.970 g/cm3.

The high-density polyethylene having a Mw of at least $1\times10^4$ and less than $8\times10^5$ is not particularly limited, and a conventionally known polyethylene may be used. In addition to an ethylene homopolymer, the polyethylene may be a copolymer containing a small amount of α-olefin other than ethylene, and a substance produced with a single-site catalyst is preferable. Examples of α-olefins other than ethylene include propylene, butene-1, pentene-1, hexene-1, 4-methylpentene-1, and octene-1.

Here, Mw is a value measured by gel permeation chromatography (GPC) described below.

The content of the ultrahigh molecular weight polyethylene in the ethylene resin is preferably at least 30 mass % and less than 70 mass % and more preferably at least 40 mass % and less than 65 mass % with respect to 100 mass % of the entire polyethylene resin. In particular, by containing a high-density polyethylene having a Mw of at least $5\times10^4$ and less than $8\times10^5$ within the range described above, it is possible to achieve both membrane production stability and high pin puncture strength of the membrane that is ultimately obtained.

In addition, other polyolefins other than the polyethylene described above may be contained, and at least one type selected from the group consisting of polybutene-1, polypentene-1, polyhexene-1, and polyoctene-1 having a Mw from $1\times10^4$ to $4\times10^6$ and polyethylene waxes having a Mw from $1\times10^3$ to $1\times10^4$ may be used.

The content of the polyolefins other than polyethylene is preferably at most 10 mass % and more preferably at most 5 mass % with respect to 100 mass % of the entire polyethylene resin.

In addition, the polyethylene resin preferably contains substantially no polypropylene.

Here. "contains essentially no polypropylene" means that the polypropylene content is at most 7 mass % with respect to 100 mass % of the entire polyethylene resin, and the content is preferably at most 5 mass % and even more preferably 0 mass %.

One type of resin component other than the ultrahigh molecular weight polyethylene may be used alone, or two or more types may be used in combination. For example, two or more types of high-density polyethylenes, medium-density polyethylenes, or low-density polyethylenes having different molecular weights may be mixed and used.

(iii) Polyethylene Resin

In the present invention, by molding the first microporous layer serving as a surface layer using a polyethylene resin containing the resin components described above, the coefficient of static friction with respect to a metal foil (Al) is at least 0.4, and a polyolefin multilayer microporous membrane which easily adheres to electrodes is thus obtained.

The Mw of the polyethylene resin (entire resin) used in the present invention is not particularly limited but is preferably from $1\times10^4$ to $1\times10^7$, more preferably from $5\times10^4$ to $15\times10^6$, and particularly preferably from $1\times10^5$ to $10\times10^6$. When the Mw of the polyethylene resin is at most $15\times10^6$, melt extrusion becomes easy.

(2) Second Microporous Layer

The second microporous layer comprises a polyolefin resin containing a high-density polyethylene and a polypropylene. By using a polypropylene as an essential component in the second microporous layer forming an intermediate layer, it is possible to achieve good meltdown characteristics, and the heat resistance is enhanced. In addition, by kneading a high-density polyethylene rather than using a polypropylene alone, melt extrusion becomes easy.

(i) High-Density Polyethylene

The high-density polyethylene used in the polyolefin resin is a polyethylene having a density of 0.940 to 0.98 g/cm$^3$ and preferably from 0.950 to 0.970 g/cm$^3$.

The Mw of the high-density polyethylene is at least $1\times10^4$ and less than $8\times10^5$, preferably at least $5\times10^4$ and less than $8\times10^5$, and more preferably at least $1\times10$ and less than $7\times10^5$.

The high-density polyethylene is not particularly limited, and a conventionally known polyethylene may be used. In addition to an ethylene homopolymer, the polyethylene may be a copolymer containing a small amount of α-olefin other than ethylene, and a substance produced with a single-site catalyst is preferable. Examples of α-olefins other than ethylene include propylene, butene-1, pentene-1, hexene-1, 4-methylpentene-1, and octene-1.

The content of the high-density polyethylene in the polyolefin resin is at least 50 mass %, preferably at least 50 mass % and less than 80 mass %, and more preferably at least 50 mass % and less than 70 mass % with respect to 100 mass % of the entire polyolefin resin. In particular, by containing a high-density polyethylene having a Mw of at least $1\times10^4$ and less than $8\times10^5$ within the range described above, melt extrusion becomes easy.

(Ii) Polypropylene

The type of polypropylene used in the present invention is not particularly limited, and a propylene homopolymer, a copolymer of propylene and another α-olefin and/or diolefin, or a mixture thereof may be used, but a homopolymer is preferable. A random copolymer or a block copolymer may be used as a copolymer. The number of carbon atoms of the α-olefin is preferably at most 8. Examples of α-olefins having at most 8 carbon atoms include ethylene, butene-1, pentene-1, 4-methylpentene-1, octene-1, vinyl acetate, methyl methacrylate, and styrene. The number of carbon atoms of the diolefin is preferably from 4 to 14. Examples of diolefins having from 4 to 14 carbon atoms include butadiene, 1,5-hexadiene, 1,7-octadiene, and 1,9- decadiene. The content of other α-olefins or diolefins is preferably less than 10 mol % when the propylene copolymer is taken as 100 mol %.

The Mw of the polypropylene is preferably from $1\times10^4$ to $5\times10^6$, more preferably from $1\times10^5$ to $4\times10^6$, and particularly preferably from $5\times10^5$ to $3\times10^6$. When a polypropylene having a Mw of less than $1\times10^4$ is used, the meltdown characteristics are diminished. On the other hand, when a polypropylene having a Mw exceeding $4\times10^6$ is used, it becomes difficult to knead the polypropylene with the polyethylene resin. The molecular weight distribution (Mw/Mn) of the polypropylene is preferably from 1.01 to 100 and more preferably from 1.1 to 50. The melting point of the polypropylene is preferably from 155 to 175° C. and more preferably from 163 to 175° C. Here, the melting point can be measured in accordance with JIS K7121.

A powdered polypropylene may be used to enhance the membrane production characteristics. The powdered polypropylene preferably has an average particle size of 100 to 2.000 μm and a particle size distribution of 50 to 3,000. Here, the average particle size and the particle size distribution can be measured in accordance with JIS K0069.

The polypropylene content is at least 5 mass % and at most 15 mass %, preferably at least 7 mass % and less than 15 mass %, and even more preferably at least 7 mass % and less than 10 mass % with respect to a total of 100 mass % of the polyethylene resin and the polyolefin resin contained in both surface layers and the intermediate layer. By containing the polypropylene within the range described above, it is possible to enhance the balance of the heat resistance and the mechanical strength.

In addition, the polypropylene content in the polyolefin resin of the intermediate layer is preferably at least 25 mass % and less than 60 mass % and more preferably at least 30 mass % and at most 50 mass % with respect to 100 mass % of the entire polyolefin resin.

(iii) Other Resin Components

The polyolefin composition may contain other resin components other than the high-density polyethylene and polypropylene as necessary. Preferable resin components other than polypropylene are crystalline resins (including partially crystalline resins) having a melting point of at least 150° C. and/or non-crystalline resins having a glass transition temperature (Tg) of at least 150° C. Here, Tg can be measured in accordance with JIS K7121.

Specific examples of resin components include polyesters, polymethylpentene [PMP or TPX (transparent polymer X), melting point: 230 to 245° C.], polyamides (PA, melting point: 215 to 265° C.), polyarylene sulfide (PAS), fluorine resins, polystyrenes (PS, melting point: 230° C.), polyvinyl alcohol (PVA, melting point: 220 to 240° C.), polyimides (PI, Tg: at least 280° C.), polyamideimides, (PAI, Tg: 280° C.), polyether sulfone (PES, Tg: 223° C.), polyether ether ketone (PEEK, melting point: 334° C.), polycarbonates (PC, melting point: 220 to 240° C.), cellulose acetate (melting point: 220° C.), cellulose triacetate (melting point: 300° C.), polysulfones (Tg: 190° C.), and polyether imides (melting point: 216° C.). The resin components are not limited to substances comprising single resin components and may be substances comprising a plurality of resin components. A preferable Mw of the resin component differs depending on the type of the resin but is typically from $1\times10^3$ to $1\times10^6$ and more preferably from $1\times10^4$ to $7\times10^5$.

(3) Polyolefin Multilayer Microporous Membrane (i) Constitution of Each Layer

The polyolefin multilayer microporous membrane of the present invention has at least three layers in which a first microporous layer serves as both surface layers and a second microporous layer serves as an intermediate layer, and the membrane preferably comprises a first microporous layer/second microporous layer/first microporous layer.

In this specification, an intermediate layer is a layer interposed between both surface layers and refers to a layer comprising the second microporous layer.

The compositions of the first microporous layer (polyethylene resin) forming both surface layers may be the same or different for each layer but are preferably the same. In addition, the second microporous layer serving as the intermediate layer is ordinarily a single layer, but it may also be formed as multiple layers as necessary. For example, a plurality of second microporous layers having different compositions may be provided. Further, a layer other than the second microporous layer serving as the intermediate layer may be provided between both surface layers, and a first porous layer having a different composition from both surface layers may also be provided.

Moreover, the polyolefin multilayer microporous membrane may be provided with layers other than the first and second microporous layers and may be formed with three or more layers as necessary. In addition, one or both sides of the polyolefin multilayer microporous membrane may be coated as necessary.

The thickness of each layer of the polyolefin multilayer microporous membrane of the present invention is not particularly limited, but the first porous layer/second porous layer (solid content mass ratio) is preferably from 90/10 to 10/90 and more preferably from 90/10 to 60/40. The thicknesses of the first porous layers constituting both surface layers may be the same or different but are preferably the same from the perspective of productivity or the like.

(ii) Various Characteristics (Pin Puncture Strength)

The pin puncture strength of the polyolefin multilayer microporous membrane of the present invention is at least 25 g/μm, preferably at least 27 g/μm, and more preferably at least 30 g/μm. When the pin puncture strength is within the range described above, the mechanical strength of the multilayer microporous membrane is excellent, and membrane puncture due to electrode active substances or the like is prevented when used as a battery separator.

The pin puncture strength can be controlled within the range described above by adjusting the content of the ultrahigh molecular weight polyethylene of the surface layers to at least 30 mass % or by setting the stretching temperature to at most 115° C. Here, the pin puncture strength is a value measured by the method described in the working examples below.

(Coefficient of Static Friction)

The coefficient of static friction in the MD direction and the TD direction of both surface layers of the polyolefin multilayer microporous membrane of the present invention with respect to a metal foil (aluminum foil) is at least 0.4, preferably from 0.4 to 0.9, and more preferably from 0.4 to 0.8. When the coefficient of static friction is within the range described above, the adhesion with adjacent electrodes (positive and negative electrodes) is enhanced when the multilayer microporous membrane is used as a battery separator, and the shape-retaining properties of the separator at a high temperature when used as a battery are excellent. As a result, the heat resistance is enhanced. It is presumed that shrinkage due to heat is suppressed by an increase in frictional force with the electrodes and that this enhances the shape-retaining properties. In addition, the average of coefficients of static friction in the MD direction and the TD direction of both surface layers of the polyolefin multilayer microporous membrane of the present invention with respect to a metal foil (aluminum foil) is preferably from 0.4 to 0.9, and more preferably from 0.4 to 0.8. Further, the ratio of MD/TD of the coefficient of friction is preferably from 0.8 to 1.2.

The coefficient of static friction can be set to within the range described above, for example, by adjusting the ultra-high molecular weight polyethylene content of the first microporous layer forming both surface layers to at least 30 mass %, adjusting the angle θ between the lip end 1 of a multilayer die and the top 2 of a cooling roller to at least 45 degrees, and adjusting the stretching temperature to at most 115° C.

Here, the coefficient of static friction is a value measured by the method described in the working examples below in accordance with JIS K7125.

(Meltdown Temperature)

The meltdown temperature of the polyolefin multilayer microporous membrane of the present invention is at least 180° C. and preferably from 180 to 190° C. The heat resistance is superior when the meltdown temperature is in the range described above. The meltdown temperature can be set within the range described above by adjusting the polypropylene content in the multilayer microporous membrane to 5 mass % to 15 mass %.

Here, the meltdown temperature is a value measured by the method described in the working examples below.

(Air Permeation Resistance)

The air permeability of the polyolefin multilayer microporous membrane of the present invention is preferably at most 600 sec/100 cc and more preferably at most 400 sec/100 cc. When the air permeability is within the range described above, the ion permeability is excellent when used as a separator.

The air permeability can be set within the range described above by setting the polypropylene content in the multilayer microporous membrane (entire multilayer membrane) to 5 to 15 mass % and appropriately adjusting the stretching temperature, the re-stretching temperature, and the like.

Here, the permeability resistance (sec/100 cc) is a value measured in accordance with JIS P-8117.

(Membrane Thickness)

The membrane thickness of the polyolefin multilayer microporous membrane of the present invention is at least 1 μm and less than 20 μm, preferably at least 3 μm and less than 19 μm, more preferably at least 3 μm and at most 16 μm, and even more preferably at least 3 μm and at most 13 μm. The polyolefin multilayer microporous membrane of the present invention has sufficient mechanical strength and heat resistance even when the membrane thickness is within the range described above.

Here, the membrane thickness is a value measured by the method described in the working examples below.

(Average Pore Size)

The average pore size of the polyolefin multilayer microporous membrane of the present invention is preferably at least 0.001 μm and less than 0.030 μm and more preferably at least 0.010 μm and less than 0.030 μm. The average pore size can be controlled by adjusting the compounding of polyolefin in the first and second microporous layers, adjusting the stretching temperature to 110 to 115° C., or the like. When the average pore size is less than 0.001 μm, it becomes physically difficult to fill the pores with an electrolytic solution when used as a battery separator, and even if filling is possible, the passage of ions is inhibited.

Here, the average pore size is a value measured by the method described in the working examples below.

(BP Pore Size)

The bubble point (BP) pore size (maximum pore size) of the polyolefin multilayer microporous membrane of the present invention refers to the maximum pore size measured using a perm-porometer. In the polyolefin multilayer microporous membrane of the present invention, the value of [BP pore size (nm)]–[average pore size (nm)] is preferably at most 15 nm and more preferably at most 10 nm. When the difference is 15 nm or greater, the pore size distribution becomes wide, and variation in safety performance also becomes large.

(Heat Resistance)

The polyolefin multilayer microporous membrane of the present invention preferably has an area retention rate of at least 90% when the polyolefin multilayer microporous membrane is disposed between the positive and negative electrodes and exposed for one hour at 150° C. When the area retention rate is less than 90%, the separator shrinks due to the heat generation of the battery when the multilayer microporous membrane is used as a battery separator, and the likely hood that shorting will occur at the ends thereof increases.

Here, the area retention rate is a value measured by the method described in the working examples below.

(Porosity)

The porosity of the polyolefin multilayer microporous membrane of the present invention is from 20 to 80%, more preferably from 30 to 7%, and even more preferably from 35 to 55%.

Here, the porosity is a value measured by the method described in the working examples below.

2. Production Method of the Polyolefin Multilayer Microporous Membrane

The production method of the polyolefin multilayer microporous membrane is not particularly limited, and a conventionally known method such as those disclosed in Patent Documents 2 and 3 can be used, but the production method preferably includes the following steps (1) to (6) and more preferably further includes the following step (7), for example.

(1) Step of preparing first and second polyolefin solutions by respectively melt-kneading the raw materials constituting each layer (polyethylene resin and polyolefin resin) and a membrane-forming solvent (2) Step of co-extruding the first and second polyolefin solutions to form a laminated sheet and then cooling to form a gel-like laminated sheet (3) Step of stretching the gel-like laminated sheet (4) Step of removing the membrane-forming solvent from the gel-like laminated sheet after stretching (5) Step of drying the laminated sheet after the removal of the membrane-forming solvent (6) Step of re-stretching the laminated sheet after drying (7) Step of performing crosslinking treatment and hydrophilization treatment on the laminated sheet after the stretching step In particular, in step (2), by forming a multilayer sheet by simultaneously extruding the first and second olefin solutions with a multilayer die under specific conditions, it is possible to produce a polyolefin multilayer microporous membrane which has excellent adhesion between each of the layers and has excellent adhesion with electrodes when used as a battery separator.

Each step will be respectively described hereinafter.

(1) First and Second Polyolefin Solution Preparation Step

First and second polyolefin solutions are prepared by respectively adding an appropriate membrane-forming solution to the polyethylene resin and the polyolefin resin and then melt-kneading the mixture. Various additives such as antioxidants, UV absorbers, anti-blocking agents, pigments, dyes, and inorganic fillers can be added to the first and second polyolefin solutions as necessary within a range that does not diminish the effect of the present invention. For example, fine powdered silicic acid can be added as a pore-forming agent.

Liquid solvents and solid solvents may both be used as membrane-forming solvents. Examples of liquid solvents include aliphatic or cyclic hydrocarbons such as nonane, decane, decalin, paraxylene, undecane, dodecane, and liquid paraffin and mineral oil fractions having corresponding boiling points. In order to obtain a gel-like sheet with a stable solvent content, it is preferable to use a non-volatile liquid solvent such as liquid paraffin. Solid solvents having a melting point of at most 80° C. are preferable, and examples of such solid solvents include paraffin wax, ceryl alcohol, stearyl alcohol, and dicylohexyl phthalate. A liquid solvent and a solid solvent may also be used in combination.

The compounding ratio of the polyethylene resin and the membrane-forming solvent in the first polyolefin solution is not particularly limited but is preferably from 70 to 80 parts by mass of the membrane-forming solvent with respect to 20 to 30 parts by mass of the polyethylene resin or the polyolefin resin. When the proportion of the polyethylene resin or the polypropylene resin is less than 20 parts by mass, swelling or neck-in formation becomes large at the die outlet when the first or second polyolefin solution is extruded, and the moldability and self-supporting characteristics of the extrudate (gel-like molded product) are diminished. On the other hand, when the proportion of the polyethylene resin or the polypropylene resin exceeds 30 parts by mass, the moldability of the gel-like molded product is diminished.

The uniform melt-kneading of the first and second polyolefin solutions is not particularly limited but is preferably performed in a twin-screw extruder. Melt-kneading in a twin-screw extruder is suitable for preparing a high-concentration polyolefin solution.

In the case of a polyethylene resin, the melt-kneading temperature is preferably in a range of the melting point of the polyethylene resin+10° C. to the melting point+100° C. Specifically, the melt-kneading temperature is preferably from 140 to 250° C. and more preferably from 170 to 240° C.

On the other hand, in the case of a polyolefin resin containing a polypropylene, the melt-kneading temperature is preferably in a range of the melting point of the polypropylene to the melting point+70° C. Specifically, the melt-kneading temperature is preferably from 170 to 280° C. and more preferably from 200 to 270° C.

In addition, when the polyolefin resin further contains a heat-resistant resin, the melt-kneading temperature is preferably set to at least the melting point of a crystalline heat-resistant resin or the glass transition temperature (Tg) of a non-crystalline heat-resistant resin depending on the type of the heat-resistant resin.

The membrane-forming solvent may be added before kneading or added during kneading from the middle of the extruder, but the latter is preferable. For melt-kneading, an antioxidant is preferably added to prevent the oxidation of the polyethylene resin.

(2) Gel-Like Sheet Forming Step

The first and second polyolefin solutions are respectively fed to a single die from the respective extruders, and both solutions are combined therein in a layered form and extruded in a sheet shape. When producing a multilayer microporous membrane having a structure comprising three or more layers, both solutions are combined in a layered form and extruded in a sheet shape so that the first polyolefin solution forms at least both surface layers and the second polyolefin solution forms at least one layer between both surface layers.

The extrusion method may be a flat die method or an inflation method. In either case, a method of supplying the solutions to separate manifolds and laminating them in a layered form at the lip inlet of a multilayer die (multiple manifold method) or a method of preparing the solutions as a flow in a layered form in advance and supplying the solutions to a die (block method) may be used. The multiple manifold method and the block method are themselves known methods, so detailed descriptions thereof will be omitted here. The gap of the multilayer flat die is from 0.1 to 3 mm; the extrusion temperature is preferably from 140 to 250° C., and the extrusion rate is preferably from 0.2 to 15 m/min. By adjusting the respective extrusion amounts of the first and second polyolefin solutions, it is possible to adjust the membrane thickness ratio of the first and second microporous layers.

In addition, the solutions extruded from the dies in this way have a large neck-in, and from the perspective of the moldability of the extrudate, the refinement of the average particle size of the polyolefin multilayer microporous membrane, and the control of the coefficient of static friction of the surface layer with respect to a metal foil, the angle θ between the lip end 1 of the multilayer die and the top 2 of the cooling roller is preferably at least 45 degrees, more preferably from 50 to 90 degrees, and even more preferably from 55 to 85 degrees, as illustrated in FIG. 1.

Here, the angle θ between the lip end 1 of the multilayer die and the top 2 of the cooling roller will be described in detail. First, FIG. 1 mentioned above will be described. FIG. 1 is a drawing of a cooling roller 2a viewed from one end side in the longitudinal direction, and the figure is drawn so that the solution flows counterclockwise (leftward) in FIG. 1 along the outer peripheral surface (circular outer surface) of the cooling roller 2a. Accordingly, the discharge port (lip end 1) of a solution in the multilayer die is formed so as to extend along the longitudinal direction of the cooling roller 2a.

As described below, a solution discharged to the cooling roller 2a is cooled by the cooling roller 2a to form a gel-like sheet, which flows toward a stretching device, a wrapping device, or the like (not illustrated) disposed on the right side in FIG. 1. Therefore, the direction from the left side to the right side in FIG. 1 is called the "film advancing direction".

In FIG. 1, a horizontal imaginary plane passing through the lower end surface of the lip end 1 (called the "first plane" hereafter) is labeled with symbol "11". In addition, an imaginary plane which is parallel to this first plane 11 and makes contact with the outer peripheral part on the upper surface side of the cooling roller 2a (called the "second plane" hereafter) is labeled with symbol "12". In FIG. 1, when a given site separated in the film advancing direction on the first plane 11 as viewed from the lip end 1 (site further to the right than the multilayer die in FIG. 1) is labeled with symbol "A, and the contact point between the second plane 12 and the cooling roller 2a (actually a straight line extending along the longitudinal direction of the cooling roller 2a) is labeled with symbol "B", the angle θ described above refers to the angle ∠AOB in FIG. 1 (here, "O" represents the lip end 1 described above, and the contact point B is synonymous with the top 2 of the cooling roller).

Accordingly, the statement that the "angle θ is 90 degrees" means that the contact point B described above is positioned directly beneath the lip end 1. In addition, when the angle θ is smaller than 90 degrees, this means that the cooling roller 2a is distanced from the multilayer die in the film advancing direction when FIG. 1 is viewed horizontally (when the multilayer die or the cooling roller 2a is viewed from the upper side).

Further, by setting the distance from the lip of the T-die to at most 300 mm and setting angle θ to within the range described above, the moldability of the gel-like molded product is excellent, and the cooling rate can be set to 50° C./min or higher.

A gel-like laminated sheet is formed by cooling the obtained laminated extrudate. As a cooling method, it is preferable to cool the extrudate by bring it into contact with a roller cooled with a cooling medium. The temperature of the cooling roller is preferably at most 40° C., more preferably from 10° C. to 35° C., and even more preferably from 15 to 32° C. This is because by setting the temperature of the cooling roller to within the range described above, the higher-order structure of the resulting gel-like laminated sheet becomes dense.

In addition, the surface of the cooling roller is preferably subjected to mirror finishing.

Cooling is preferably performed at a cooling rate of at least 50° C./min up to at least the gelling temperature. Cooling is preferably performed up to at most 25° C. As a result of cooling, it is possible to solidify the micro-phases of the first and second polyolefins separated by the membrane-forming solvents. Typically, when the cooling rate is reduced, pseudo-cell units become large, and the higher-order structure of the resulting gel-like laminated sheet becomes rough, but dense cell units are formed when the cooling rate is increased. When the cooling rate is set to less than 50° C./min, the crystallization temperature increases, which makes it difficult to form a gel-like laminated sheet suitable for stretching. As a cooling method, a method of bringing the substance into contact with a cooling medium such as cold air or cooling water, a method of bringing the substance into contact with a cooling roller, or the like can be used.

(3) Stretching of the Gel-Like Laminated Sheet

The obtained gel-like laminated sheet is stretched in at least two axial directions. Since the gel-like laminated sheet contains a membrane-forming solvent, it can be stretched uniformly. The gel-like laminated sheet is preferably stretched to a prescribed ratio after heating with a tenter method, a roller method, an inflation method, or a combination thereof. Stretching is preferably biaxial stretching, and simultaneous biaxial stretching, sequential stretching, and multi-step stretching (for example, a combination of simultaneous biaxial stretching and sequential stretching) may be used.

The stretching ratio is preferably at least 3 times in either direction in the case of biaxial stretching (the area ratio is preferably at least 9 times, more preferably at least 16 times, and particularly preferably at least 25 times). Setting the area ratio to at least 9 times enhances the pin puncture strength. When the area ratio exceeds 400 times, restrictions arise from the perspective of the stretching device, the stretching operations, or the like.

The stretching temperature is particularly preferably set to within a range of 110° C. to 115° C.

When the stretching temperature is less than 110° C., the softening of the polyethylene resin is insufficient, and the membrane is easily torn by stretching, so stretching cannot be performed at a high ratio. In addition, it is difficult to enhance the mechanical strength at a stretching ratio of 116° C. or higher.

The stretching described above can create cleavages between polyethylene lamellas, refine the polyethylene phases, and form a multiplicity of fibrils. The fibrils form a mesh structure with three-dimensional irregular linkages. The stretching improves the mechanical strength and expands the microporous pores, which is suitable for a battery separator.

Stretching may be performed after establishing a temperature distribution in the membrane thickness direction in accordance with the desired physical properties, and this yields a multilayer microporous membrane with even better mechanical strength. The details of this method are described in Japanese Patent No. 3347854.

(4) Membrane-Forming Solvent Removal

A washing solvent is used for removal (washing) of the membrane-forming solvent. The first and second polyolefin phases are separated from the membrane-forming solvent and thus comprise fibrils forming a fine three-dimensional mesh structure when the membrane-forming solvent is removed, resulting in a porous membrane having pores (gaps) linked irregularly in three dimensions. Examples of appropriate washing solvents are readily volatile solvents including saturated hydrocarbons such as pentane, hexane, and heptane, chlorinated hydrocarbons such as methylene chloride and carbon tetrachloride, ethers such as diethylether and dioxane, ketones such as methyl ethyl ketone, chain fluorocarbons such as ethane tetrafluoride, $C_6F_{14}$, and $C_7F_{16}$, cyclic hydrofluorocarbons such as $C_5H_3F_7$, hydrofluoroethers such as $C_4F_9OCH_3$ and $C_4F_9OC_2H_5$, and perfluoroethers such as $C_4F_9OCF_3$ and $C_4F_9OC_2F_5$.

The washing of the gel-like laminated sheet may be performed with a method of immersing the sheet in the washing solvent, a method of showering the sheet with the washing solvent, or a combination thereof. The washing solvent is preferably used in an amount of 300 to 30,000 parts by mass with respect to 100 parts by mass of the membrane. The washing temperature may be from 15 to 30° C., and washing may be performed while heating as necessary. The temperature of washing while heating is preferably at most 80° C. Washing with the washing solvent is preferably performed until the remaining amount of the liquid solvent is less than 1 mass % of the initial added amount.

(5) Drying

The laminated microporous membrane from which the membrane-forming solvent has been removed is dried by heat drying or air drying. Taking the laminated microporous membrane as 100 mass % (dry weight), drying is preferably performed until the remaining washing solvent is 5 mass % or less and more preferably until the remaining washing solvent is 3 mass % or less. When drying is insufficient, the porosity of the laminated microporous membrane decreases and the permeability is diminished when the subsequent laminated microporous membrane stretching step and heat treatment step are performed.

(6) Re-Stretching

After drying, the laminated microporous membrane is stretched (re-stretched) in at least one axial direction. The stretching of the laminated microporous membrane can be performed while heating with a tenter method or the like, as described above. Stretching may be uniaxial stretching or biaxial stretching. In the case of biaxial stretching, simultaneous biaxial stretching and sequential stretching may be used, but simultaneous biaxial stretching is preferable. Re-stretching is ordinarily performed on a laminated microporous membrane in a long sheet shape obtained from a gel-like laminated sheet, so the MD direction and TD direction at the time of re-stretching match the MD direction and TD direction at the time of the stretching of the gel-like laminated sheet. This is also true for the other production method examples.

The re-stretching temperature is not particularly limited but is ordinarily from 90 to 135° C. and more preferably from 95 to 130° C.

The ratio of the re-stretching of the laminated microporous membrane in one axial direction is preferably from 1.1 to 1.8 times. In the case of uniaxial stretching, the ratio is set to 1.1 to 1.8 times in the longitudinal direction (MD direction) or the transverse direction (TD). In the case of biaxial stretching, the ratios are respectively set to 1.1 to 1.8 times in the longitudinal direction and the transverse direction, and the ratios may be the same or different from one another but are preferably the same in the longitudinal direction and the transverse direction.

The proportion of ultrahigh molecular weight polyethylene in the first microporous layer is at least 30 mass %, so even if it is stretched 1.1 to 1.8 times, the average pore size will not exceed that of the second microporous layer. In addition, the average pore size of the second microporous layer is reduced by setting the polypropylene content to at least 25 mass % and less than 60 mass % and more preferably at least 30 mass % and at most 50 mass %. When the propylene content of the second microporous layer is set to at most 25 mass %, the average pore size can be easily set to at least 0.030 μm.

When the re-stretching ratio of the laminated microporous membrane is set to less than 1.1 times, a hybrid structure is not formed in the second microporous layer, and the permeability, electrolyte absorbency, and electrolyte retention are diminished. On the other hand, when the stretching ratio exceeds 1.8 times, the fibrils become too narrow, and the heat shrinkage resistance and electrolyte retention are diminished. The stretching ratio is more preferably set to 1.2 to 1.6 times.

(7) Crosslinking Treatment and Hydrophilization Treatment

In addition, crosslinking treatment and hydrophilization treatment may also be further performed on the multilayer microporous membrane after bonding or stretching.

For example, crosslinking treatment is performed by irradiating the laminated microporous membrane with ionizing radiation such as α-rays, β-rays, γ-rays, or an electron beam. In the case of an electron beam, an electron dose of 0.1 to 100 Mrad is preferable, and an acceleration voltage of 100 to 300 kV is preferable. The meltdown temperature of the laminated microporous membrane increases due to crosslinking treatment.

In addition, hydrophilization treatment can be performed by monomer graft, surfactant treatment, corona discharge, and the like. Monomer graft is preferably performed after the crosslinking treatment.

3. Battery Separator

The polyolefin multilayer microporous membrane of the present invention can be preferably used as a separator for nickel-hydrogen batteries, nickel-cadmium batteries, nickel-zinc batteries, silver-zinc batteries, and secondary batteries such as lithium secondary batteries, and lithium polymer secondary batteries but is preferably used as a separator for a lithium secondary battery. A lithium secondary battery will be explained as an example hereinafter.

In lithium ion secondary batteries, a positive electrode and a negative electrode are laminated with a separator interposed therebetween, and the separator contains an electrolytic solution (an electrolyte). The electrode structure is not particularly limited, but when a conventionally known electrode structure is used, an electrode structure in which a disc-shaped positive electrode and a negative electrode are placed facing each other (coin type), an electrode structure in which planar positive electrodes and negative electrodes are alternately laminated (lamination type), an electrode structure in which a band-shaped positive electrode and negative electrode are wound (winding type) and the like, for example, can be employed. Of these, the winding type is preferable.

The positive electrode normally comprises a current collector and a positive-electrode active material layer formed on the surface of the current collector and containing a positive-electrode active material capable of absorbing and desorbing lithium ions. Examples of the positive-electrode active material include inorganic compounds such as a transition metal oxide, a composite oxide of lithium and a transition metal (lithium composite oxide), and a transition metal sulfide, and examples of transition metals include V, Mn, Fe, Co, and Ni. Preferred examples of the lithium composite oxide include lithium nickel oxide, lithium cobalt oxide, lithium manganese oxide, a lamellar lithium composite oxide having an α-$NaFeO_2$-type structure as a matrix, and the like. The production method of the positive electrode is not particularly limited, but a positive electrode paste is produced, for example, by mixing a positive electrode active material, a conductive material, and a binding agent, further adding activated carbon or a solvent for the purpose of adjusting the viscosity or the like as necessary, and then kneading the components. The resulting positive electrode paste can be formed into a positive electrode, for example, by applying the paste to the surface of a current collector made of an aluminum foil, drying the paste, and then dispersing the solvent.

The negative electrode has a current collector and a layer containing a negative-electrode active material layer formed on the surface of the current collector and containing a negative-electrode active material. Examples of the negative-electrode active material include carbonaceous materials such as natural graphite, artificial graphite, cokes, carbon black and the like. The production method for the negative electrode is not particularly limited, but a negative electrode paste, for example, is produced by mixing a binder with a negative electrode active material and then adding an appropriate solvent. The resulting negative electrode paste can be formed into a negative electrode by applying the paste to the surface of a current collector made of a metal foil such as copper, drying the paste, and compressing it as necessary in order to increase the electrode density.

An electrolytic solution is obtained by dissolving a lithium salt in an organic solvent. Examples of the lithium salts include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2FS)_3$, a lithium salt of a lower aliphatic carboxylic acid, $LiAlCl_4$, and the like. These can be used alone or in a combination of two or more types thereof.

Examples of the organic solvent include an organic solvent having a high boiling point and a high dielectric constant such as ethylene carbonate, propylene carbonate, ethylmethyl carbonate, γ-butyrolactone and the like, and an organic solvent having a low boiling point and a low viscosity such as tetrahydrofuran, 2-methyltetrahydrofuran, dimethoxyethane, dioxolane, dimethyl carbonate, diethyl carbonate and the like. These can be used alone or in a combination of two or more types thereof. In particular, since an organic solvent having a high dielectric constant has a high viscosity, and an organic solvent having a low viscosity has a low dielectric constant, a mixture of each type of an organic solvent is preferably used.

Upon assembling a battery, the separator is impregnated with an electrolytic solution. This makes it possible to impart ion permeability to the separator (multilayer microporous membrane). Usually, impregnation treatment is carried out by immersing a microporous membrane in an electrolytic solution at normal temperature. When a cylindrical battery is assembled, a positive electrode sheet, a separator comprising a multilayer microporous membrane, and a negative electrode sheet are laminated in this order, for example, and the resulting laminate is wound up from one end to form a winding-type electrode element. This electrode element is inserted into a battery can, and impregnated with the electrolyte solution described above, followed by caulking a battery cap having a safety valve and serving as a positive electrode terminal via a gasket. A battery can thus be obtained.

The present invention is not limited to the embodiments described above and can be variously modified within the scope of the gist thereof.

EXAMPLES

The present invention will be described in further detail hereinafter using working examples, but the modes for carrying out the present invention are not limited to these working examples.

The evaluation methods and the respective methods and materials used for analysis in the working examples are as follows.

1. Evaluation Methods and Analysis Methods (1) Air Permeation Resistance (Sec/100 cc)

The polyolefin laminated microporous membrane of the present invention was fixed to a measurement part so that there were no bubbles using an EGO1 digital Oken-type air permeability testing machine manufactured by Asahi Seiko Co., Ltd., and the air permeability was measured in accordance with JIS P-8117 (2009). A sample was cut into a 5 cm square, and the measurement point was defined as one point in the center of the sample. The measurement value was used as the air permeability [sec] of the sample. The same measurement was performed for ten test pieces collected from discretionary film positions, and the average value of the 10 measurement values was used as the air permeability of the polyolefin laminated microporous membrane (sec/100 mL).

(2) Membrane Thickness (μm)

A test piece was produced by cutting out a square 5 cm in the longitudinal direction and 5 cm in the width direction from an arbitrary position of the polyolefin laminated microporous membrane. Any five points on the test piece were measured using a contact thickness measurement device, and the average value was taken as the thickness of that test piece. Ten test pieces of the same polyolefin laminated microporous film were prepared and measured. The average value of all 10 test pieces was taken as the thickness of the polyolefin laminated microporous film.

The thickness measurement device used was a Litematic VL-50A manufactured by Mitutoyo Corp.

3. Porosity (%)

The porosity is measured using the following formula, wherein the weight w1 of the microporous membrane and the weight w2 of a polymer of equal value without pores (polymer of the same width, length, and composition) are compared.

$$\text{Porosity (\%)}=(w2-w1)/w2 \times 100$$

(4) Pin Puncture Strength (Gf, g/μm)

A maximum load was measured when a needle 1 mm in diameter with a spherical tip (radius of curvature R: 0.5 mm) was pierced into a microporous membrane of a membrane thickness T1 at a piercing velocity of 2 mm/sec.

(5) Average Pore Size (Average Flow Rate Pore Size) and Bubble Point (BP) Pore Size (nm)

Measurements were taken in the order of Dry-up and Wet-up using a perm-porometer of PMI Co., Ltd. (trade name, model: CFP-1500A). For Wet-up measurements, pressure was applied to a microporous membrane sufficiently immersed in Galwick (trade name) having a known surface tension, and the pore size calculated from the pressure at which air started to penetrate the membrane was taken as the maximum pore size. For the average flow rate size, the pore size was calculated from the pressure used in Dry-up measurements and the pressure at a point where a curve indicating a 1/2 slope of the flow rate curve and a curve of the Wet-up measurements intersect. The following formula was used to calculate the pressure and pore size.

$$d=C\cdot\gamma/P$$

In the formula "d (μm)" is the pore size of the microporous membrane; "γ(mN/m)" is the surface tension of the liquid; "P (Pa)" is the pressure; and "C" is a constant.

(6) Coefficient of Static Friction

An autograph (AGS-J) manufactured by the Shimadzu Corporation was used for measurements. For the respective vertical direction (MD) and width direction (TD) of the front surface A and back surface B of the polyolefin microporous porous membrane, the coefficient of static friction of each with respect to a piece of aluminum foil having a thickness of 50 μm (hard aluminum foil manufactured by the UACJ Foil Corporation) was measured three times and averaged in accordance with JIS K7125 (1999). Here, the front surface A refers to the surface on the opposite side (air side) as the surface in contact with the cooling roller, and the back surface B refers to the surface in contact with the cooling roller.

(7) Falling Ball Meltdown Temperature

A 50 mm square polyolefin microporous membrane is sandwiched using a metal block frame having a hole with a diameter of 12 mm, and a tungsten carbonite ball with a diameter of 10 mm is placed on the porous membrane (at a position overlapping the hole in the block frame). The porous membrane is placed so as to have a flat surface in the horizontal direction. The membrane is heated at 5° ° C./min starting from 30° C. The temperature when the porous membrane was punctured by the ball was measured three times, and the average temperature was taken as the meltdown temperature.

(8) Heat Resistance Evaluation (150° C. Exposure Test)

Figure 2:
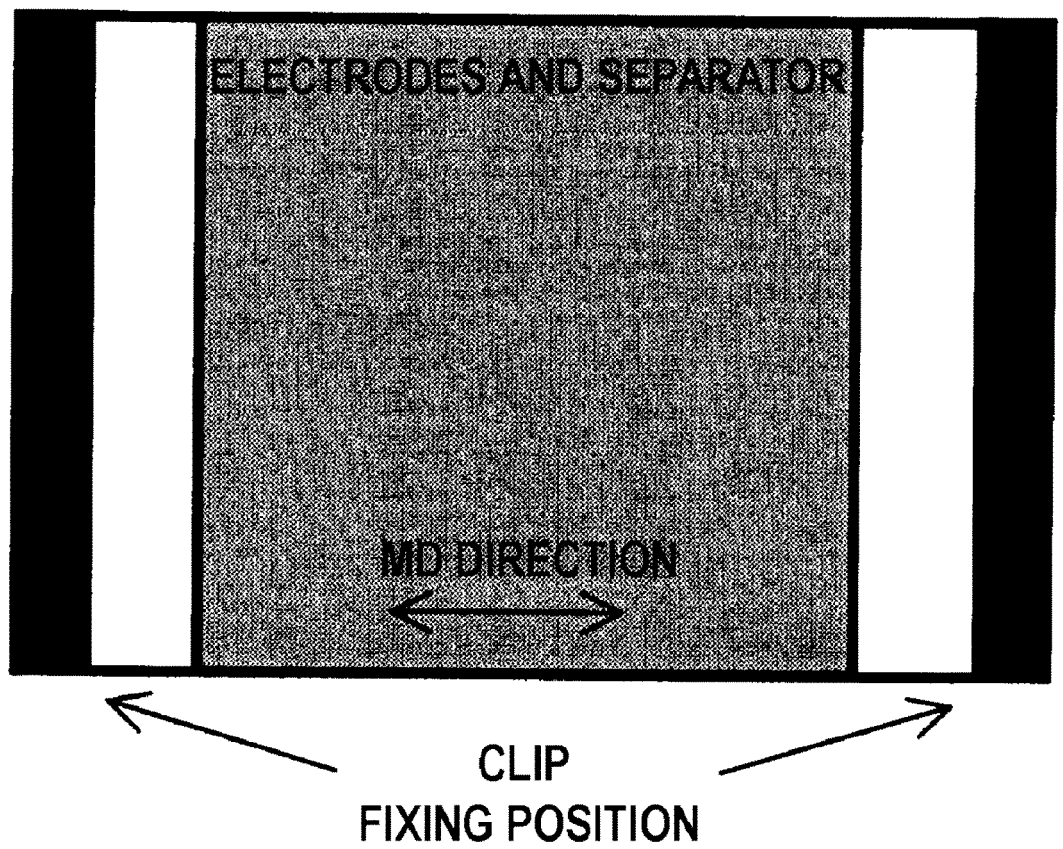
FIG. 2 is an explanatory diagram illustrating the form of exposure tests at 150° C.

A 50 mm square polyolefin microporous membrane was sandwiched between a 50 mm square positive electrode (lithium cobaltate: manufactured by PIOTREK) and a negative electrode (graphite: manufactured by PIOTREK), and a sample in which this was sequentially sandwiched in the order of the positive electrode, the polyolefin microporous porous membrane, and the negative electrode was placed between two glass sheets (3t×50×80 mm) so that the long sides of the glass sheets were in the MD direction. Only the short sides of the glass sheets were fixed with a clip at a position of 10 mm from the outside, and this was used as an evaluation sample (FIG. 2). The sample was left for one hour in an oven at 150° C. Next, the sample was retrieved from the oven, and after it was cooled for 10 minutes, the area retention rate of the sample after the test was measured while taking the sample area before the test as 100%. As an evaluation of heat resistance, cases in which the area retention rate was 95% or higher were evaluated as ○ (excellent); cases in which the area retention rate was from 90% to 95% were evaluated as Δ (good); and cases in which the area retention rate was 90% or lower were evaluated as x (poor).

(9) Weight Average Molecular Weight (Mw)

The Mw of UHMWPE and HDPE were determined by gel permeation chromatography (GPC) under the following conditions.

Measurement apparatus: GPC-150C, manufactured by Waters Corporation
    Column: Shodex UT806M, manufactured by Showa Denko, K. K.
    Column temperature: 135° C.
    Solvent (mobile phase): o-dichlorobenzene
    Solvent flow rate: 1.0 mL/min
    Sample Concentration: 0.1 wt. % (dissolution conditions: 135° C./1 h)
    Injection quantity: 500 μL
    Detector: differential refractometer manufactured by Waters Corporation (RI detector)
    Calibration curve: Created using predetermined conversion constant from calibration curve obtained using monodisperse polystyrene standard sample

(10) Electrolyte Wettability

A 50 mm square polyolefin microporous porous membrane was placed on a 65×100 mm square glass sheet, and 0.5 mL of propylene carbonate was dropped onto the membrane. The penetration time was measured five times, and cases in which all measurements were 5 minutes or less were evaluated as ○ (excellent), while cases in which even one measurement was 5 minutes or greater were evaluated as x (poor).

2. Working Examples

Working Example 1

(1) Preparation of First Polyolefin Solution

A mixture was prepared by adding 0.2 parts by mass of tetrakis-[methylene-3-(3,5-ditertiary butyl-4-hydroxyphenyl)-propionate]methane as an antioxidant to 100 parts by mass of a polyethylene resin comprising 40 mass % of an ultrahigh molecular weight polyethylene (UHPE) having a Mw of $2.0\times10^6$ and 60 mass % of a high-density polyethylene (HDPE) having a Mw of $5.6\times10^5$.

A first polyolefin solution was prepared by charging 25 parts by mass of the obtained mixture into a strong kneading type twin-screw extruder, supplying 75 parts by mass of liquid paraffin [35 cSt (40° C.)] from the side feeder of the twin-screw extruder, and melt-kneading the mixture under conditions at 230° C. and 250 rpm.

(2) Preparation of Second Polyolefin Solution

A mixture was prepared by adding 0.2 parts by mass of tetrakis-[methylene-3-(3,5-ditertiary butyl-4-hydroxyphenyl)-propionate]methane as an antioxidant to 100 parts by mass of a polyolefin resin comprising 50 mass % of a high-density polyethylene (HDPE) having a Mw of $5.6\times10^5$ and 50 mass % of a polypropylene (PP) having a Mw of $1.6\times10^6$.

A second polyolefin solution was prepared by charging 30 parts by mass of the obtained mixture into a separate twin-screw extruder of the same type as that described above, supplying 70 parts by mass of liquid paraffin [35 cSt (40° C.)] from the side feeder of the twin-screw extruder, and melt-kneading the mixture under the same conditions as those described above.

(3) Extrusion

The first and second polyolefin solutions were supplied to a three-layer T-die from each of the twin-screw extruders and extruded so that the layer thickness ratio of the first polyolefin solution/second polyolefin solution/first polyolefin solution was 40/20/40. The extrudate was cooled while being pulled by a cooling roller (diameter: 500 mm) adjusted to a temperature of 31° C. so as to form a gel-like three-layer sheet. At this time, the angle θ between the die lip and the cooling roller was adjusted to 45 degrees.

(4) Stretching of the Gel-Like Laminated Sheet and Removal and Drying of the Membrane-Forming Solvent Biaxial stretching was performed simultaneously at 114° C. at a ratio of 5×5 times on the gel-like three-layer sheet to obtain a stretched membrane. The obtained stretched membrane was washed with methylene chloride to extract and remove residual liquid paraffin, and it was then dried.

(5) Re-Stretching and Heat Setting of the Laminated Microporous Membrane

After the obtained laminated microporous membrane was re-stretched 1.6 times in the TD direction at a temperature of 124° C. with a tenter stretching machine, the width was fixed in this state inside the tenter stretching machine to produce a polyolefin three-layer microporous membrane.

The compounding ratio of each component of the polyolefin three-layer microporous membrane that was produced, the production conditions, the evaluation results, and the like are listed in Table 1.

Working Example 2

A polyolefin three-layer microporous membrane was produced under the same conditions as in Working Example 1 with the exception that the thickness ratio of the polyolefin three-layer microporous membrane was set to 42.5/15/42.5, the angle θ to the cooling roller was set to 75 degrees, and re-stretching and heat setting were performed by re-stretching 1.6 times in the TD direction at a temperature of 127° C.

Working Example 3

A polyolefin three-layer microporous membrane was produced under the same conditions as in Working Example 2 with the exception that the temperature of the cooling roller was set to 18° C. and that re-stretching and heat setting were performed by re-stretching 1.6 times in the TD direction at a temperature of 125° C.

Working Example 4

A polyolefin three-layer microporous membrane was produced under the same conditions as in Working Example 1 with the exception that resins were mixed at the ratios shown in Table 1, the thickness ratio of the polyolefin three-layer microporous membrane was set to 35/30/35, the angle θ to the cooling roller was set to 75 degrees, the cooling roller temperature was set to 37° C., the stretching temperature was set to 114° ° C., and re-stretching and heat setting were performed by re-stretching 1.4 times in the TD direction at a temperature of 124° C.

Working Example 5

A polyolefin three-layer microporous membrane was produced under the same conditions as in Working Example 4 with the exception that re-stretching and heat setting temperature of the polyolefin three-layer microporous membrane was set to 123° C. and that the membrane thickness was set to 8 μm.

Working Example 6

A polyolefin three-layer microporous membrane with a membrane thickness of 6 m was produced under the same conditions as in Working Example 3 with the exception that re-stretching and heat setting were performed at 126° C.

Comparative Example 1

A polyolefin three-layer microporous membrane was produced under the same conditions as in Working Example 1 with the exception that resins were mixed at the ratios shown in Table 1, the second polyolefin solution was used for both surface layers and the first polyolefin solution was used for the intermediate layer, the thickness ratio was set to 15/70/15, the cooling roller temperature was set to 20° C., the stretching temperature was set to 116° C., and re-stretching and heat setting were performed by re-stretching 1.3 times in the TD direction at a temperature of 124° C.

Comparative Example 2

A polyolefin three-layer microporous membrane was produced under the same conditions as in Comparative Example 1 with the exception that the thickness ratio was set to 10/80/10 and that re-stretching and heat setting were performed by re-stretching 1.3 times in the TD direction at a temperature of 125° C.

Comparative Example 3

A polyolefin three-layer microporous membrane was produced under the same conditions as in Comparative Example 1 with the exception that resins were mixed at the ratios shown in Table 1, the thickness ratio was set to 10/80/10, the angle θ to the cooling roller was set to 41 degrees, the cooling roller temperature was set to 29° C., the stretching temperature was set to 115° C., and re-stretching and heat setting were performed by re-stretching 1.4 times in the TD direction at a temperature of 125° C.

Comparative Example 4

A polyolefin three-layer microporous membrane was produced under the same conditions as in Comparative Example 2 with the exception that the temperature of the cooling roller was set to 15° C. and that re-stretching and heat setting were performed by re-stretching 1.3 times in the TD direction at a temperature of 124° C.

Comparative Example 5

A polyolefin three-layer microporous membrane was produced under the same conditions as in Comparative Example 1 with the exception that resins were mixed at the ratios shown in Table 1, the thickness ratio of the polyolefin three-layer microporous membrane was set to 7.5/85/7.5, the angle θ to the cooling roller was set to 43 degrees, the cooling roller temperature was set to 40° C., and re-stretching and heat setting were performed by re-stretching 1.4 times in the TD direction at a temperature of 125° C.

Comparative Example 6

A polyolefin three-layer microporous membrane was produced under the same conditions as in Working Example 5 with the exception that resins were mixed at the ratios shown in Table 1, the thickness ratio was set to 40/20/40, the angle θ to the cooling roller was set to 37 degrees, the cooling roller temperature was set to 21° C., the stretching temperature was set to 115° C., and re-stretching and heat setting were performed by re-stretching 1.4 times in the TD direction at a temperature of 126° C.

TABLE 1

| | | | Working Example 1 | Working Example 2 | Working Example 3 | Working Example 4 | Working Example 5 | Working Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|---|
| Surface layer | UHPE | Mass % | 40 | 40 | 40 | 30 | 30 | 40 | — | — | — | — | — | 30 |
| | HDPE | | 60 | 60 | 60 | 70 | 70 | 60 | 50 | 50 | 80 | 50 | 30 | 70 |
| | PP | | — | — | — | — | — | — | 50 | 50 | 20 | 50 | 70 | — |
| Intermediate layer | UHPE | Mass % | — | — | — | — | — | — | — | — | — | — | — | — |
| | HDPE | | 50 | 50 | 50 | 50 | 50 | 50 | 30 | 30 | 40 | 30 | 30 | 50 |
| | PP | | 50 | 50 | 50 | 50 | 50 | 50 | 70 | 70 | 60 | 70 | 70 | 50 |
| Entire | Total PP | Mass % | 10.0% | 7.5% | 7.5% | 15.0% | 15.0% | 7.5% | 15.0% | 10.0% | 4.0% | 10.0% | 10.5% | 10.0% |
| | Thickness ratio | — | 40/20/40 | 42.5/15/42.5 | 42.5/15/42.5 | 35/30/35 | 35/30/35 | 42.5/15/42.5 | 15/70/15 | 10/80/10 | 10/80/10 | 10/80/10 | 7.5/85/7.5 | 40/20/40 |
| Production Conditions | Cooling roller angle | Degrees | 45 | 75 | 75 | 75 | 75 | 75 | 45 | 45 | 41 | 45 | 43 | 37 |
| | Cooling-Roll Temperature | °C. | 31 | 31 | 18 | 37 | 37 | 18 | 20 | 20 | 29 | 15 | 40 | 21 |
| | Stretching temperature | °C. | 113 | 113 | 113 | 114 | 114 | 113 | 116 | 116 | 115 | 116 | 116 | 115 |
| Air Permeation Resistance (Membrane thickness) | | sec/100 cc Air | 220 | 290 | 350 | 210 | 250 | 470 | 240 | 230 | 130 | 290 | 900 | 240 |
| Porosity | | μm | 12 | 9 | 8 | 10 | 8 | 6 | 13 | 13 | 12 | 16 | 17 | 20 |
| Pin Puncture Strength | | % | 51 | 42 | 44 | 49 | 46 | 42 | 49 | 46 | 46 | 51 | 42 | 47 |
| | | gf | 386 | 334 | 302 | 285 | 250 | 240 | 316 | 333 | 338 | 405 | 512 | 530 |
| | | g/μm | 32 | 37 | 38 | 29 | 31 | 40 | 24 | 26 | 28 | 25 | 30 | 27 |
| Average Pore Size | | nm | 20 | 22 | 20 | 20 | 17 | 15 | 19 | 19 | 31 | 20 | Unmeasurable | 28 |
| BP pore size (Average BP pore size) | | nm | 29 | 34 | 26 | 29 | 25 | 23 | 26 | 26 | 48 | 26 | 18 | 49 |
| | | | 10 | 11 | 6 | 9 | 8 | 8 | 7 | 7 | 17 | 6 | — | 21 |
| Coefficient of static friction | A-MD | — | 0.56 | 0.48 | 0.44 | 0.52 | 0.45 | 0.45 | 0.38 | 0.37 | 0.31 | 0.39 | 0.40 | 0.41 |
| | B-MD | — | 0.73 | 0.55 | 0.55 | 0.61 | 0.61 | 0.54 | 0.49 | 0.45 | 0.44 | 0.50 | 0.41 | 0.42 |
| | B-MD | — | 0.73 | 0.55 | 0.55 | 0.61 | 0.61 | 0.54 | 0.49 | 0.45 | 0.44 | 0.50 | 0.41 | 0.42 |
| | MD average | — | 0.64 | 0.52 | 0.50 | 0.57 | 0.53 | 0.50 | 0.43 | 0.41 | 0.38 | 0.44 | 0.41 | 0.42 |
| | A-TD | — | 0.66 | 0.52 | 0.44 | 0.51 | 0.45 | 0.45 | 0.40 | 0.38 | 0.34 | 0.41 | 0.40 | 0.34 |
| | B-TD | — | 0.72 | 0.53 | 0.58 | 0.58 | 0.51 | 0.56 | 0.46 | 0.46 | 0.43 | 0.50 | 0.39 | 0.42 |
| | TD average | — | 0.69 | 0.53 | 0.51 | 0.54 | 0.48 | 0.51 | 0.43 | 0.42 | 0.39 | 0.45 | 0.40 | 0.38 |
| Falling ball meltdown Temperature | | °C. | 189 | 184 | 182 | 183 | 186 | 182 | 172 | 171 | 166 | 179 | 177 | 179 |
| Thermal shrinkage (150° C., 1 hr) | | — | ○ | ○ | ○ | △ | △ | ○ | x | x | x | x | ○ | x |
| Wettability | | | ○ | ○ | ○ | ○ | ○ | ○ | ○ | ○ | ○ | ○ | x | ○ |

In Working Examples 1 to 6, which satisfy the requirements of the present invention, the mechanical strength such as the pin puncture strength is sufficient, and the coefficient of static friction is at least 0.4 under all of the conditions, while the meltdown temperature is at least 180° C. The area retention rate is thus at least 90% in 150° C. exposure test, and it is clear that the composition has excellent heat resistance. On the other hand, in Comparative Examples 1 to 4, the surface layers comprise polyolefin resins, and the intermediate layer comprises a polyethylene resin, so the coefficient of static friction in both the MD and TD directions of one or both sides is at most 0.4, and the meltdown temperature is not at least 180° C. In addition, in Comparative Example 5, the polypropylene content of the surface layers is high, so the electrolyte wettability is poor, and the electrolyte air permeation resistance is at least 600 sec/100 cm, so the battery performance is diminished. Further, in Comparative Example 6, although the layer structure is the same as in Working Examples 4 and 5, the production conditions differ, so the coefficient of static friction in both the MD and TD direction of one or both sides is at most 0.4, and the meltdown temperature is not at least 180° C.

EXPLANATION OF SYMBOLS 1 (◯) Lip end
2 (B) Top of cooling roller
3, θ Angle between die lip and cooling roller

What is claimed is:

1. A polyolefin multilayer microporous membrane, comprising:
   a first microporous layer being a first surface layer;
   a second microporous layer being an intermediate layer; and
   a third microporous layer being a second surface layer, the second microporous layer being between the first and third microporous layers,
   wherein the first and third microporous layer each comprise a polyethylene resin comprising an ultrahigh molecular weight polyethylene between 30 mass % and 70 mass %, wherein the ultrahigh molecular weight polyethylene has an average molecular weight of at least $1 \times 10^6$,
   wherein the second microporous layer comprises a polyolefin resin comprising:
      at least 50 mass % of a high-density polyethylene having an average molecular weight of at least $1 \times 10^4$ and less than $8 \times 10^5$, and
      a polypropylene,
   wherein a polypropylene content in the multilayer microporous membrane is at least 5 mass % and at most 15 mass % with respect to the total mass of the polyethylene resin and the polyolefin resin contained in the first and second surface layers and in the intermediate layer,
   wherein the first, second, and third microporous layers comprise pores having an average pore size of at least 0.001 µm and less than 0.030 µm,
   wherein a film thickness of the microporous membrane is at least 1 µm and less than 20 µm, and
   wherein an air permeability of the microporous membrane is at most 600 sec/100 cc,
   wherein the polyolefin multilayer microporous membrane has:
      (I) A pin puncture strength of at least 25 g/µm,
      (II) A coefficient of static friction in an MD direction and in a TD direction of the first and second surface layers with respect to an aluminum foil being respectively at least 0.40, and
      (III) A meltdown temperature of at least 180° C.

2. The polyolefin multilayer microporous membrane according to claim 1, wherein an area retention rate of the microporous membrane is at least 90% when the polyolefin multilayer microporous membrane is disposed between positive and negative electrodes of a lithium ion secondary battery and exposed for one hour at 150° C.

3. A battery separator comprising a polyolefin microporous membrane, wherein the polyolefin microporous membrane comprises:
   a first microporous layer being a first surface layer;
   a second microporous layer being an intermediate layer; and
   a third microporous layer being a second surface layer, the second microporous layer being between the first and third microporous layers,
   wherein the first and third microporous layer each comprise a polyethylene resin comprising an ultrahigh molecular weight polyethylene between 30 mass % and 70 mass %, wherein the ultrahigh molecular weight polyethylene has an average molecular weight of at least $1 \times 10^6$,
   wherein the second microporous layer comprises a polyolefin resin comprising:
      at least 50 mass % of a high-density polyethylene having an average molecular weight of at least $1 \times 10^4$ and less than $8 \times 10^5$, and
      a polypropylene,
   wherein a polypropylene content in the multilayer microporous membrane is at least 5 mass % and at most 15 mass % with respect to the total mass of the polyethylene resin and the polyolefin resin contained in the first and second surface layers and in the intermediate layer,
   wherein the first, second, and third microporous layers comprise pores having an average pore size of at least 0.001 µm and less than 0.030 µm,
   wherein a film thickness of the microporous membrane is at least 1 µm and less than 20 µm, and
   wherein an air permeability of the microporous membrane is at most 600 sec/100 cc,
   wherein the polyolefin multilayer microporous membrane has:
      (I) A pin puncture strength of at least 25 g/µm,
      (II) A coefficient of static friction in an MD direction and in a TD direction of the first and second surface layers with respect to an aluminum foil being respectively at least 0.40, and
      (III) A meltdown temperature of at least 180° C.

4. The battery separator according to claim 3, wherein an area retention rate of the microporous membrane is at least 90% when the polyolefin multilayer microporous membrane is disposed between positive and negative electrodes of a lithium ion secondary battery and exposed for one hour at 150° C.

* * * * *